United States Patent
Nishikawa et al.

(10) Patent No.: US 12,107,244 B2
(45) Date of Patent: Oct. 1, 2024

(54) METHOD FOR RECOVERING VALUABLE MATERIAL FROM LITHIUM ION SECONDARY BATTERY

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Norio Nakajima, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 816 days.

(21) Appl. No.: 16/733,537

(22) Filed: Jan. 3, 2020

(65) Prior Publication Data
US 2021/0210807 A1 Jul. 8, 2021

(51) Int. Cl.
*H01M 10/54* (2006.01)
*B02C 19/18* (2006.01)
(Continued)

(52) U.S. Cl.
CPC ........... *H01M 10/54* (2013.01); *B02C 19/186* (2013.01); *B02C 23/10* (2013.01); *B02C 23/14* (2013.01);
(Continued)

(58) Field of Classification Search
CPC ....... B02C 19/186; B02C 23/10; B02C 23/16; B03C 23/14; B03C 1/30; B03C 2201/20; B07B 2220/04
(Continued)

(56) References Cited

U.S. PATENT DOCUMENTS 5,575,907 A 11/1996 Lindermann
2020/0078796 A1 3/2020 Kochhar et al.

FOREIGN PATENT DOCUMENTS

CN 105671316 A 6/2016
EP 1041659 A1 10/2000
(Continued)

OTHER PUBLICATIONS

Honda, Akitake, "Method for Recovering Valuables from Lithium Ion Secondary Battery (English Translation)" (Dec. 7, 2015), worldwide.espacenet.com (Year: 2015).*
Yamaguchi, Yosuke, "Method for Recovering Valuable Material from Lithium Ion Battery (English Translation)" (Oct. 23, 2014), worldwide.espacenet.com (Year: 2014).*
(Continued)

*Primary Examiner* — Michael McCullough
*Assistant Examiner* — Molly K Devine
(74) *Attorney, Agent, or Firm* — Greenblum & Bernstein, P.L.C.

(57) ABSTRACT

A method for recovering a valuable material from a lithium ion secondary battery includes: a heat treatment step of performing heat treatment on a lithium ion secondary battery; a crushing step of crushing a heat-treated object obtained through the heat treatment step; a first stage of classification step of classifying a crushed object obtained through the crushing step based on a classification point of 1.2 to 2.4 mm, and a second stage of classification step of classifying an intermediate product and a fine particle product obtained on a fine side in the first stage of classification step based on a classification point of 0.3 mm or less; and a dry magnetic separation step of repeating one time or more a step of performing dry magnetic separation on an intermediate product obtained on a coarse side in the second stage of classification step and performing dry magnetic separation again.

8 Claims, 1 Drawing Sheet

(51) Int. Cl.
  *B02C 23/10*    (2006.01)
  *B02C 23/14*    (2006.01)
  *B02C 23/16*    (2006.01)
  *B03C 1/30*     (2006.01)
  *H01M 10/0525*  (2010.01)

(52) U.S. Cl.
  CPC .......... *B02C 23/16* (2013.01); *B03C 1/30* (2013.01); *H01M 10/0525* (2013.01); *B03C 2201/20* (2013.01)

(58) Field of Classification Search
  USPC .......................................................... 241/24.1
  See application file for complete search history.

(56) References Cited

FOREIGN PATENT DOCUMENTS

| EP | 1049190 A1 | 11/2000 | |
| JP | H07245126 A * | 9/1995 | ............ B09B 5/00 |
| JP | 3443446 | 6/2003 | |
| JP | 2004-011010 | 1/2004 | |
| JP | 2012-79630 | 4/2012 | |
| JP | 2014-199774 A | 10/2014 | |
| JP | 2015-219948 A | 12/2015 | |
| JP | 2016-219402 | 12/2016 | |
| JP | 2017-004920 | 1/2017 | |
| JP | 2017-037807 | 2/2017 | |
| JP | 6268130 | 1/2018 | |
| JP | 2018-078024 A | 5/2018 | |
| KR | 101883100 B1 * | 7/2018 | ............ H01M 10/54 |

OTHER PUBLICATIONS

II, Sohn, 'Method of Recovering Valuable Metals from Wasted Batteries and System for the Same' (English Translation), Jul. 27, 2018, worldwide.espacenet.com (Year: 2018).*
Nishikawa; Chihiro, "Recovery Method of Valuables from Lithium Ion Secondary Battery" (English Translation), Dec. 22, 2016, worldwide.espacenet.com (Year: 2016).*
Hiroyuki; Tsuji, "Method for Recovering Valuable Material from Lithium-Ion Battery" (English Translation), Jan. 5, 2017, worldwide.espacenet.com (Year: 2017).*
Hiroichi; Miyashita, "Recovery Method of Cobalt from Used Lithium Secondary Battery" (English Translation), Sep. 19, 1995, worldwide.espacenet.com (Year: 1995).*
European Search Report, European Patent Office, Application No. 19215583.6, issued Jun. 19, 2020.
Official Action, U.S. Patent and Trademark Office, in U.S. Appl. No. 16/733,525, issued on Apr. 29, 2022.
"Investigation of Heating Conditions for Cobalt Recovering from Spent Lithium Ion Batteries by Magnetic Separation", Kagaku Kogaku Ronbunshu, vol. 43, Issue 4, 2017, pp. 213-218.
Japan Office Action, Japan Patent Office, Application No. 2019-186789, issued on Feb. 4, 2020.
The Extended European Search Report, European Patent Office, Application No. 19213865.9, issued May 8, 2020.
Office Action, Intellectual Property Office of Singapore, issued in counterpart Singapore Patent Application No. 10201912384S, dated Oct. 14, 2021 (in English).
Nishikawa et al., U.S. Appl. No. 16/733,525, the application was filed Jan. 3, 2020.

* cited by examiner

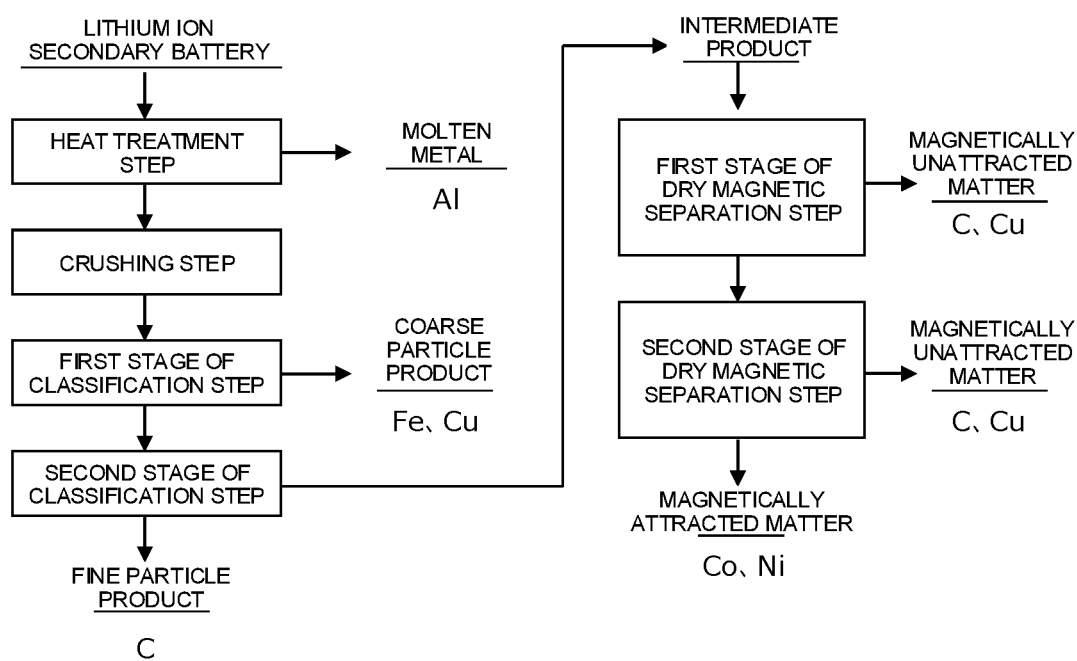

METHOD FOR RECOVERING VALUABLE MATERIAL FROM LITHIUM ION SECONDARY BATTERY

TECHNICAL FIELD

The present invention relates to a method for recovering a valuable material from a lithium ion secondary battery capable of recovering a valuable material from a positive electrode current collector, a negative electrode current collector, a positive electrode active material, and the like of a lithium ion secondary battery which is a defective product generated in a manufacturing process, and a lithium ion secondary battery which is discarded due to end of operating life of a device using the battery, end of operating life of the battery, and so on.

BACKGROUND ART

A lithium ion secondary battery is a secondary battery having a lighter weight, higher capacity, and a higher electromotive force when compared to conventional lead-acid battery, nickel-cadmium secondary battery, and so on, and is used as a secondary battery for a personal computer, an electric vehicle, a portable equipment, and so on. For example, a valuable material such as cobalt and nickel is used for a positive electrode of a lithium ion secondary battery as lithium cobaltate ($LiCoO_2$), a ternary positive electrode material ($LiNi_xCo_yMn_zO_2$ (x+y+z=1)), or the like.

Since the lithium ion secondary battery is expected to be used more in the future, recovery of a valuable material from a lithium ion secondary battery which is a defective product generated in a manufacturing process, and a lithium ion secondary battery which is discarded due to end of operating life of a device using the battery, end of operating life of the battery, and so on, is desired from a viewpoint of recycling of resources. When recovering a valuable material from a lithium ion secondary battery, it is important that various metals used in the battery are separated and recovered, in terms of increase in value of a recovered material.

As a method for recovering a valuable material from a lithium ion secondary battery, there is proposed a method for recovering cobalt and nickel from a crushed object of a heat-treated object of lithium ion battery. For example, Patent Document 1 discloses a method in which a used lithium secondary battery is heat-treated and crushed, and then the crushed object is subjected to sieving, and magnetic separation is performed on particles below a sieve, to thereby recover cobalt.

PRIOR ART DOCUMENT

Patent Document

Patent Document 1: Japanese Patent No. 3443446

DISCLOSURE OF THE INVENTION

Problems to be Solved by the Invention

When a lithium ion secondary battery is heat-treated, and then crushed and classified, a metal such as iron derived from external container and member, and a metal such as copper derived from a current collector are recovered in a coarse particle product. Further, although cobalt and nickel are concentrated in a fine particle product, a part of a metal derived from the current collector is also mixed in the fine particle product. For the purpose of recycling cobalt and nickel, it is required to separate and recover the metal derived from the current collector and a negative electrode active material from the fine particle product. The active material has a structure such that it is adhered to the current collector by a binder, so that in order to recover each of the current collector and the active material with a high grade, decomposition of the binder and liberation of the current collector and the active material are required. In the method described in the aforementioned Patent Document 1, there are problems as follows. (1) Shear-type crushing is employed, and thus liberation of a current collector and an active material is not good except at a portion with which a shearing blade is brought into contact during crushing, (2) a performance of magnetic separation is not sufficient, and thus a grade of carbon derived from a negative electrode active material in a cobalt concentrate is high, and (3) since a metal derived from a negative electrode current collector such as copper in a lithium ion secondary battery is not only a main valuable material but also an impurity in recycling of cobalt and nickel, it is desired to be separated to be recovered, but, no study is conducted regarding a method for separating and recovering the metal derived from the negative electrode current collector from cobalt and nickel. Mainly due to the reasons of (1) and (2), it has been difficult to reduce a grade of the metal derived from the negative electrode current collector such as copper in a cobalt and nickel concentrate to less than 0.2%, and reduce a grade of a material derived from the negative electrode active material such as carbon to less than 5%. Further, due to the reason of (3), it has been difficult to separate and recover the metal derived from the negative electrode current collector by 50% or more from a cobalt and nickel recovered material.

The present invention has been made based on the above-described circumstances, and an object thereof is to provide a means capable of recovering a valuable material such as cobalt and nickel, and a metal derived from a negative electrode current collector such as copper, with a low grade of impurities and a high recovery ratio.

Means for Solving the Problems

To solve the above-described problems, according to the present invention, there is provided a method for recovering a valuable material from a lithium ion secondary battery, the method being characterized in that it includes: a heat treatment step of performing heat treatment on a lithium ion secondary battery; a crushing step of crushing a heat-treated object obtained through the heat treatment step; a first stage of classification step of classifying a crushed object obtained through the crushing step based on a classification point of 1.2 to 2.4 mm, and a second stage of classification step of classifying an intermediate product and a fine particle product obtained on a fine side in the first stage of classification step based on a classification point of 0.3 mm or less; and a dry magnetic separation step of repeating one time or more a step of performing dry magnetic separation on an intermediate product obtained on a coarse side in the second stage of classification step and performing dry magnetic separation again on an obtained magnetically attracted matter.

It is also possible that aluminum is melted and separated in the heat treatment step to be recovered. Further, in the magnetically attracted matter obtained through the dry magnetic separation step, a content of a material derived from a negative electrode active material may be less than 5%. In that case, the material derived from the negative electrode active material may be carbon. Further, in the magnetically attracted matter obtained through the dry magnetic separation step, a grade of a metal derived from a negative electrode current collector may be less than 0.2%. In that case, the metal derived from the negative electrode current collector may be copper. Further, it is also possible that the heat treatment step is performed under a low oxygen atmosphere having an oxygen concentration of 10.5 mass % or less. Besides, it is also possible to further provide a dry magnetic separation step of performing dry magnetic separation on a coarse particle product obtained on a coarse side in the first stage of classification step.

Effect of the Invention

According to the present invention, it becomes possible to, when recovering a valuable material from a lithium ion secondary battery, recover a valuable material such as cobalt and nickel with a low grade of a metal derived from a negative electrode current collector and a low grade of a negative electrode active material.

BRIEF DESCRIPTION OF THE DRAWINGS

FIG. 1 is a flow chart explaining a recovery method according to an embodiment of the present invention.

EMBODIMENTS FOR CARRYING OUT THE INVENTION

Hereinafter, one example of an embodiment for carrying out the present invention will be explained.
<Lithium Ion Secondary Battery>
A lithium ion secondary battery is a secondary battery in which a lithium ion travels between a positive electrode and a negative electrode to perform charge and discharge, and there can be cited one, for example, which includes a positive electrode, a negative electrode, a separator, an electrolytic solution containing an electrolyte and an organic solvent, and an external container being a battery case housing the positive electrode, the negative electrode, the separator, and the electrolytic solution.

A shape, a structure, a size, a material, and so on of the lithium ion secondary battery are not particularly limited, and can be appropriately selected according to purposes. As the shape of the lithium ion secondary battery, there can be cited, for example, a laminate type, a cylindrical type, a button type, a coin type, a square type, a flat type, and so on.

The positive electrode is not particularly limited as long as it has a positive electrode material on a positive electrode current collector, and can be appropriately selected according to purposes. A shape of the positive electrode is not particularly limited and can be appropriately selected according to purposes, and there can be cited a flat plate shape, a sheet shape, and the like, for example.

The positive electrode current collector is not particularly limited regarding its shape, structure, size, material, and so on, and can be appropriately selected according to purposes. As the shape of the positive electrode current collector, a foil shape and the like can be cited, for example. As the material of the positive electrode current collector, there can be cited, for example, stainless steel, nickel, aluminum, copper, titanium, tantalum, and so on. Among the above, aluminum is preferable.

The positive electrode material is not particularly limited and can be appropriately selected according to purposes, and there can be cited, for example, a positive electrode material which contains at least a positive electrode active material containing a rare valuable material, and contains a conductive agent and a binder resin according to need. Although the rare valuable material is not particularly limited and can be appropriately selected according to purposes, it is preferably at least any one of cobalt, nickel, and manganese.

As the positive electrode active material, there can be cited, for example, lithium cobaltate ($LiCoO_2$), lithium nickelate ($LiNiO_2$), lithium manganate ($LiMn_2O_4$), lithium cobalt-nickelate ($LiCo_{1/2}Ni_{1/2}O_2$), $LiNi_xCo_yMn_zO_2$, composites of the respective elements, and the like.

The conductive agent is not particularly limited and can be appropriately selected according to purposes, and there can be cited, for example, carbon black, graphite, carbon fiber, metal carbide, and the like.

The binder resin is not particularly limited and can be appropriately selected according to purposes, and there can be cited, for example, a homopolymer such as vinylidene fluoride, ethylene tetrafluoride, acrylonitrile, or ethylene oxide, or a copolymer thereof, a styrene-butadiene rubber, and the like.

The negative electrode is not particularly limited as long as it has a negative electrode material on a negative electrode current collector, and can be appropriately selected according to purposes. A shape of the negative electrode is not particularly limited and can be appropriately selected according to purposes, and there can be cited a flat plate shape, a sheet shape, and the like, for example.

As of the negative electrode current collector, a shape, a structure, a size, a material, and so on are not particularly limited and can be appropriately selected according to purposes. As the shape of the negative electrode current collector, there can be cited a foil shape and the like, for example. As the material of the negative electrode current collector, there can be cited, for example, stainless steel, nickel, aluminum, copper, titanium, tantalum, and the like. Among the above, copper is preferable.

The negative electrode material is not particularly limited and can be appropriately selected according to purposes, and there can be cited, for example, a carbon material such as graphite or hard carbon, titanate, silicon, composites of the respective elements, and the like.

Note that the positive electrode current collector and the negative electrode current collector have a structure of stack, and the stack is not particularly limited and can be appropriately selected according to purposes.

In the embodiment of the present invention, a metal derived from the external container such as aluminum and iron, a metal derived from a positive electrode active material such as cobalt and nickel, and a metal derived from a negative electrode current collector such as copper contained in a lithium ion secondary battery are efficiently separated to be recovered through a procedure illustrated in FIG. 1. The lithium ion secondary battery to be used for the recovery is not particularly limited and can be appropriately selected according to purposes, and there can be cited, for example, a lithium ion secondary battery which is a defective product generated in a manufacturing process of the lithium ion secondary battery, a lithium ion secondary battery which is discarded due to defect of a device using the battery, end of operating life of the device using the battery, and so on, a used lithium ion secondary battery which is discarded due to end of its operating life, and so on.
<Heat Treatment Step>
As illustrated in FIG. 1, a heat treatment step is first performed on a lithium ion secondary battery. A heat treatment temperature is not particularly limited as long as it is a temperature equal to or higher than a melting point of a current collector having a lower melting point out of the positive electrode current collector and the negative electrode current collector, and less than a melting point of the current collector having a higher melting point out of the positive electrode current collector and the negative electrode current collector, and can be appropriately selected according to purposes. However, the heat treatment temperature is preferably 670° C. or more, more preferably 670° C. or more and 1100° C. or less, and particularly preferably 700° C. or more and 900° C. or less. If the heat treatment temperature is less than 670° C., embrittlement of the current collector having the low melting point does not occur sufficiently in some cases, and if the heat treatment temperature exceeds 1100° C., all of the current collector having the low melting point, the current collector having the high melting point, and the external container are embrittled, resulting in that a separation efficiency of the current collectors from a cobalt and nickel concentrate based on crushing and classification is reduced. Further, when the external container of the lithium ion secondary battery is melted during the heat treatment, by disposing a tray for recovering the molten metal below the lithium ion secondary battery, it is possible to easily separate the metal derived from the external container and an electrode part.

By performing the heat treatment at the predetermined heat treatment temperature, in a stack in which a positive electrode current collector is aluminum and a negative electrode current collector is copper, for example, the positive electrode current collector made of aluminum foil is embrittled, and is likely to be turned into fine particles in a later-described crushing step. This embrittlement of the positive electrode current collector is caused by melting or an oxidation reaction. Further, the melted and run-down aluminum is recovered by the tray. On the other hand, the negative electrode current collector made of copper is heat-treated at a temperature which is less than a melting point of copper, so that it is not melted and can be selected at a high level in a later-described dry magnetic separation step. Further, when either the stack or the lithium ion secondary battery is housed in an oxygen-shielding container to be heat-treated, the positive electrode current collector made of aluminum foil is melted to be embrittled, and is likely to be turned into fine particles in the later-described crushing step, and on the other hand, the negative electrode current collector made of copper is heat-treated in a state where an oxygen partial pressure is low because of an oxygen-shielding effect of the oxygen-shielding container and a reducing effect provided by a negative electrode active material such as carbon contained in the stack or the lithium ion secondary battery, and thus the embrittlement of the negative electrode current collector due to oxidation does not occur. Consequently, the positive electrode current collector is finely crushed by crushing in the crushing step, and the negative electrode current collector exists in a form of coarse particles even after the crushing, and can be selected more effectively at a higher level in later-described first stage of classification step and second stage of classification step.

Although a heat treatment time is not particularly limited and can be appropriately selected according to purposes, it is preferably 1 minute or more and 5 hours or less, more preferably 1 minute or more and 2 hours or less, and particularly preferably 1 minute or more and 1 hour or less. The heat treatment time is only required to be a heat treatment time which is taken for making a temperature of the current collector having the low melting point reach a desired temperature, and a holding time may be short. The heat treatment time within a particularly preferable range is advantageous in terms of cost required for the heat treatment.

A method of the heat treatment is not particularly limited and can be appropriately selected according to purposes, and there can be cited a method of performing the heat treatment by using a heat treatment furnace, for example. As the heat treatment furnace, there can be cited, for example, a rotary kiln, a fluidized-bed furnace, a tunnel furnace, a batch-type furnace such as a muffle furnace, a cupola furnace, a stoker furnace, and the like.

Although an atmosphere used for the heat treatment is not particularly limited and can be appropriately selected according to purposes, the heat treatment can be performed in the air. To set an atmosphere with low oxygen concentration is preferable from a point that the metal derived from the positive electrode current collector and the metal derived from the negative electrode current collector can be recovered with high grade and high recovery ratio.

Concretely, a low oxygen atmosphere having an oxygen concentration of 10.5 mass % or less is preferable from a point that the metal derived from the positive electrode current collector and the metal derived from the negative electrode current collector can be recovered with high grade and high recovery ratio. It is desirable to suppress oxidation of the valuable metal of the lithium ion secondary battery by performing a heat treatment step in an atmosphere in which an oxygen concentration is adjusted to low concentration (low oxygen atmosphere). Namely, by making cobalt which exists as $LiCoO_2$ (diamagnet) to be subjected to heat treatment to be reduced under coexistence with a negative electrode active material, cobalt can be changed to cobalt metal (ferromagnet).

As a method of realizing the aforementioned low oxygen atmosphere, it is also possible to perform the heat treatment by housing the lithium ion secondary battery or the stack in an oxygen-shielding container. A material of the oxygen-shielding container is not particularly limited as long as it is a material having a melting point which is equal to or higher than that of the current collector having the higher melting point out of the positive electrode current collector and the negative electrode current collector and can be appropriately selected according to purposes. For example, when the positive electrode current collector is aluminum and the negative electrode current collector is copper, there can be cited, as the material of the oxygen-shielding container, iron, stainless steel, and so on having a melting point higher than 660.32° C. which is a melting point of aluminum. In order to release a gas pressure due to combustion of electrolytic solution in the lithium ion battery or the stack, it is preferable to provide an opening to the oxygen-shielding container. An opening area of the opening is preferably set to be 12.5% or less with respect to a surface area of an external container to which the opening is provided. The opening area of the opening is more preferably 6.3% or less with respect to the surface area of the external container to which the opening is provided. If the opening area of the opening exceeds 12.5% with respect to the surface area of the external container, a large proportion of the current collector is likely to be oxidized by the heat treatment. The opening is not particularly limited regarding its shape, size, formation position, and so on, and can be appropriately selected according to purposes.

<Crushing Step>

Next, a crushing step of crushing the heat-treated object obtained through the heat treatment step is performed. In the crushing step, it is preferable to crush the heat-treated object by impact, to thereby obtain a crushed object.

Further, the crushing is not particularly limited, and can be appropriately selected according to purposes. As a method of performing crushing through impact, there can be cited a method in which the heat-treated object is thrown by a rotating striking plate and dashed against a collision plate, to thereby apply an impact to the heat-treated object, and a method in which the heat-treated object is struck by a rotating beater, which can be performed by using a hammer crusher, a chain crusher, or the like, for example. Further, there can be cited a method in which the heat-treated object is struck by a ball or a rod made of ceramic, iron, or the like, and the method can be performed by using a ball mill, a rod mill, or the like. Further, the crushing can be performed by using a biaxial crusher having a short blade width and a short blade length, which performs crushing through compression.

By obtaining the crushed object through the impact, liberation of the active material and the current collector is favorably caused. Further, although the active material is originally a particle of several tens of nm, the current collector has a foil shape, so that disintegration of the active material is preferentially caused by the impact crushing, resulting in that separation can be performed through sieving.

Although a crushing time is not particularly limited and can be appropriately selected according to purposes, a processing time per 1 kg of the lithium ion secondary battery is preferably 1 second or more and 30 minutes or less, more preferably 2 seconds or more and 10 minutes or less, and particularly preferably 3 seconds or more and 5 minutes or less. If the crushing time is less than 1 second, the crushing is not performed in some cases, and if the crushing time exceeds 30 minutes, the crushing is sometimes performed excessively.

<First Stage of Classification Step>

Next, a first stage of classification step of classifying the crushed object obtained through the crushing step into a coarse particle product, an intermediate product, and a fine particle product, is performed. A classification method is not particularly limited and can be appropriately selected according to purposes, and the method can be performed by using, for example, a vibrating sieve, a multistage vibrating sieve, a cyclone, a standard sieve according to JIS Z8801, a wet vibrating table, an air table, or the like.

Regarding a classification point used in the first stage of classification step, a sieve with an opening of 1.2 to 2.4 mm is used. When the classification point exceeds 2.4 mm, mixing of the metal derived from the external container and the metal having higher melting point into the fine particle product is increased, which reduces a performance of separation between the metal, and cobalt and nickel derived from the active material. On the other hand, when the classification point is less than 1.2 mm, mixing of the metal derived from the current collector having the low melting point and the active material into the coarse particle product is increased, resulting in that a grade of the metal derived from the current collector having the high melting point in the coarse particle product is reduced, and a recovery ratio of cobalt and nickel derived from the positive electrode active material in the fine particle product is reduced.

<Second Stage of Classification>

A second stage of classification step is performed on an intermediate product and a fine particle product obtained on a fine side in the first stage of classification step, resulting in that an intermediate product containing the metal derived from the positive electrode active material such as cobalt and nickel is recovered on a coarse side, and a fine particle product containing carbon is recovered on a fine side. As an opening of a sieve mesh of a sieve used in the second stage of classification step, a classification point of 0.3 mm or less is employed. When the classification point exceeds 0.3 mm, mixing of cobalt and nickel into the fine particle product is increased, which reduces a recovery ratio of cobalt and nickel in the intermediate product.

By these classifications, the metal derived from the external container and the current collector having the high melting point can be separated to be recovered as the coarse particle product, the intermediate product containing the positive electrode active material such as cobalt and nickel can be separated to be recovered as the intermediate product, and the negative electrode active material such as carbon can be separated to be recovered as the fine particle product.

Further, regarding the current collector in the foil shape, when a sieve is used as the classification method, by putting a disintegration promoter such as, for example, a stainless-steel ball or an alumina ball on the sieve to perform the sieving, a small amount of the current collector remained on the sieve and having the low melting point is disintegrated and turned into fine particles, which enables to further improve the grade of the metal of the external container and the current collector having the high melting point in the coarse particle product.

<Dry Magnetic Separation Step of Coarse Particle Product<

Next, a dry magnetic separation step may be performed on the coarse particle product obtained on the coarse side in the first stage of classification step. In this case, iron is recovered as a magnetically attracted matter, and the metal derived from the current collector having the high melting point such as copper can be recovered as a magnetically unattracted matter.

<Dry Magnetic Separation Step of Intermediate Product>

The intermediate product obtained on the coarse side in the second stage of classification step is subjected to a dry magnetic separation step of two stages in which a magnetically attracted matter recovered in a first stage of magnetic separation is subjected to magnetic separation again, which is a second stage of magnetic separation. Cobalt and nickel are recovered as a magnetically attracted matter, and copper and carbon derived from the negative electrode material are moved to a magnetically unattracted matter. By this magnetic separation, when the negative electrode current collector is copper and the negative electrode active material is carbon, for example, the grade of the metal derived from the negative electrode current collector such as copper and the grade of the material derived from the negative electrode active material such as carbon in the intermediate product, namely, the cobalt and nickel concentrate, can be set to less than 0.2% and less than 5%, respectively. When the dry magnetic separation is performed by one stage, a proportion of the negative electrode current collector and the negative electrode active material which are recovered by being included in cobalt and nickel is high, resulting in that the grade of the metal derived from the negative electrode current collector in the cobalt and nickel concentrate which is recovered as the magnetically attracted matter cannot be set to less than 0.2% or the grade of the material derived from the negative electrode active material in the cobalt and nickel concentrate cannot be set to less than 5%. Note that there is a case where aggregation of particles occurs due to adhesive moisture between particles when performing the dry magnetic separation on the intermediate product, so that by performing drying processing and the like after the second stage of classification step according to need, it is possible to sufficiently separate the metal derived from the negative electrode material, and cobalt and nickel particles.

<Re-Crushing and Re-Magnetic Separation of Magnetically Attracted Matter after Dry Magnetic Separation>

In the magnetically attracted matter after the dry magnetic separation, the metal derived from the negative electrode current collector which should be recovered as a magnetically unattracted matter under normal circumstances, is sometimes recovered by including cobalt being the magnetically attracted matter during the aforementioned impact crushing. In order to facilitate liberation of these particles, by making the magnetically attracted matter after the magnetic separation to be subjected to re-crushing and re-magnetic separation, it is possible to reduce the grade of the metal derived from the negative electrode current collector in the cobalt and nickel concentrate.

EXAMPLE

Hereinafter, examples of the present invention will be described. Note that the present invention is not limited to the following examples.

Example 1

As illustrated in a flow in FIG. 1, a lithium ion secondary battery of about 3.7 Kg was subjected to a heat treatment step by using a muffle furnace (FJ-41, manufactured by Yamato Scientific Co., Ltd.) as a heat treatment apparatus under a condition of a heat treatment temperature of 850° C. (1 hour for increasing temperature, 2 hours for holding) and an air supply amount of 5 L/min. Next, in a crushing step, a hammer crusher (Makino-type swing hammer crusher HC-20-3.7, manufactured by MAKINO MFG. CO., LTD.) was used as a crushing apparatus, and crushing was additionally performed one time under a condition of 50 HZ (hammer peripheral speed of 38 m/s) and a hole diameter of a punching metal at an outlet part of 10 mm.

Next, as a first stage of classification step, the crushed object obtained through the crushing step was subjected to sieving by using a sieve with an opening of a sieve mesh of 1.2 mm. A particle on the sieve of 1.2 mm (coarse side) and a particle below the sieve (fine side) after the sieving were respectively collected. The product below the sieve (the intermediate product and the fine particle product) was subjected to classification again which is a second stage of classification by using a sieve of 0.3 mm, resulting in that cobalt and nickel were recovered in the intermediate product, and carbon was recovered in the fine particle product.

The intermediate product obtained on the sieve (coarse side) in the second stage of classification was subjected to two stages of dry magnetic separation by using a hand magnet with a length of 150 mm and a diameter of 20 mm, in a state where a magnetic force of 1500 G was employed and an interval of 10 mm was provided between the hand magnet and the intermediate product.

Further, the coarse particle product obtained on the sieve (coarse side) in the first stage of classification was also subjected to dry magnetic separation through a procedure similar to that of the dry magnetic separation with respect to the intermediate product obtained on the sieve (coarse side) in the second stage of classification.

The mass of the coarse particle product, the fine particle product, and the magnetically attracted matter and the magnetically unattracted matter obtained in the dry magnetic separation with respect to the intermediate product obtained on the sieve (coarse side) in the second stage of classification was measured, and after that, they were heated and dissolved in aqua regia, and analysis was performed by using a high-frequency inductively coupled plasma emission spectrochemical analyzer (iCaP6300, manufactured by Thermo Fisher Scientific K.K.), to thereby determine a recovery ratio of cobalt and nickel, and a content ratio of recovered various metals. Analysis results regarding grades of the magnetically attracted matter and the magnetically unattracted matter obtained by performing the magnetic separation on the intermediate product are shown in Table 1. Recovery ratios of the respective valuable materials in the respective products are shown in Table 2. Note that in Table 1 and Table 2, each of (%) indicates mass %. Further, in Table 2, a particle on the sieve (coarse side) was expressed by "+", and a particle below the sieve (fine side) was expressed by "−".

Example 2

A method similar to that of the example 1 was employed except that the opening in the second stage of sieving was set to 0.15 mm. Results are similarly shown in Tables 1 and 2.

Example 3

A method similar to that of the example 1 was employed except that the opening in the first stage of sieving was set to 2.4 mm. Results are similarly shown in Tables 1 and 2.

Comparative Example 1

A method similar to that of the example 3 was employed except that the opening in the first stage of sieving was set to 4.8 mm.

Comparative Example 2

A method similar to that of the example 1 was employed except that the opening in the second stage of sieving was set to 0.6 mm.

Comparative Example 3

A method similar to that of the example 1 was employed except that the magnetic separation was performed by one stage.

Comparative Example 4

A procedure similar to that of the example 1 was employed except that the second stage of sieving was not performed, and dry magnetic separation was applied to the matter below the sieve obtained in the first stage of sieving.

As shown in Tables 1 and 2, it was possible to confirm that in the cobalt and nickel concentrate obtained by the recovery method of the present invention, the grade of copper is less than 0.2%, and the grade of carbon is less than 5%. In the comparative example 1, the grade of iron in the magnetically attracted matter exceeded 10% as shown in Table 1, and thus it was not possible to obtain a high-quality cobalt and nickel concentrate. In the comparative example 2, it was not possible to recover cobalt and nickel by 50% or more in the magnetically attracted matter, as shown in Table 2. In the comparative examples 3 and 4, it was not possible to recover the cobalt and nickel concentrate with the grade of copper of less than 0.2% or the grade of carbon of less than 5%, as shown in Table 1.

TABLE 1

| GRADE | EXAMPLE 1 | | EXAMPLE 2 | | EXAMPLE 3 | | COMPARATIVE EXAMPLE 1 | | COMPARATIVE EXAMPLE 2 | | COMPARATIVE EXAMPLE 3 | | COMPARATIVE EXAMPLE 4 | |
|---|---|---|---|---|---|---|---|---|---|---|---|---|---|---|
| | MAG (*1) (%) | non-MAG(*2) (%) | MAG (%) | non-MAG (%) | MAG (%) | non-MAG (%) | MAG (%) | non-MAG (%) | MAG (%) | non-MAG (%) | MAG (%) | non-MAG (%) | MAG (%) | non-MAG (%) |
| Ni | 59.2 | 4.0 | 59.0 | 4.0 | 58.2 | 3.1 | 50.4 | 2.5 | 45.5 | 1.3 | 58.9 | 2.5 | 55.6 | 1.4 |
| Co | 10.2 | 0.7 | 10.2 | 0.7 | 10.0 | 0.5 | 8.6 | 0.4 | 8.3 | 0.2 | 10.1 | 0.4 | 9.6 | 0.3 |
| Cu | 0.0 | 49.8 | 0.1 | 37.1 | 0.0 | 56.3 | 0.0 | 58.7 | 0.1 | 61.0 | 0.3 | 51.5 | 0.1 | 7.6 |
| Fe | 0.9 | 1.2 | 1.1 | 1.3 | 2.1 | 0.9 | 15.4 | 0.7 | 5.2 | 0.8 | 0.9 | 1.1 | 1.1 | 0.8 |
| C | 3.5 | 26.1 | 3.5 | 24.4 | 3.4 | 21.1 | 2.9 | 16.9 | N/A | N/A | 6.6 | 8.9 | 7.7 | 66.9 |
| F | 1.6 | N/A | 1.6 | N/A | 1.6 | N/A | N/A | N/A | N/A | N/A | N/A | N/A | N/A | N/A |

(*1) MAG: MAGNETICALLY ATTRACTED MATTER
(*2) non-MAG: MAGNETICALLY UNATTRACTED MATTER
(*3) N/A: Values not measured in this embodiment

TABLE 2

EXAMPLE 1

| RECOVERY RATIO | COARSE PARTICLE +1.2 mm (%) | INTERMEDIATE PRODUCT -1.2 +0.3 mm MAG(*1) (%) | INTERMEDIATE PRODUCT -1.2 +0.3 mm non-MAG(*2) (%) | FINE PARTICLE -0.3 mm (%) |
|---|---|---|---|---|
| Ni | 3.5 | 88.8 | 1.1 | 6.6 |
| Co | 0.0 | 91.9 | 1.1 | 7.0 |
| Cu | 65.7 | 0.1 | 28.9 | 5.3 |
| Fe | 95.4 | 1.7 | 0.4 | 2.5 |
| C  | 0.7 | 3.5 | 4.7 | 11.1 |

EXAMPLE 2

| RECOVERY RATIO | COARSE PARTICLE +1.2 mm (%) | INTERMEDIATE PRODUCT -1.2 +0.15 mm MAG (%) | INTERMEDIATE PRODUCT -1.2 +0.15 mm non-MAG (%) | FINE PARTICLE -0.15 mm (%) |
|---|---|---|---|---|
| Ni | 3.5 | 92.4 | 1.6 | 2.5 |
| Co | 0.0 | 96.8 | 1.6 | 1.6 |
| Cu | 65.7 | 0.2 | 25.2 | 8.9 |
| Fe | 95.4 | 1.6 | 0.5 | 2.5 |
| C  | 0.7 | 3.8 | 6.5 | 89.0 |

EXAMPLE 3

| RECOVERY RATIO | COARSE PARTICLE +2.4 mm (%) | INTERMEDIATE PRODUCT -2.4 +0.3 mm MAG (%) | INTERMEDIATE PRODUCT -2.4 +0.3 mm non-MAG (%) | FINE PARTICLE -0.3 mm (%) |
|---|---|---|---|---|
| Ni | 1.8 | 90.4 | 1.1 | 6.7 |
| Co | 0.1 | 91.8 | 1.1 | 7.0 |
| Cu | 38.0 | 0.2 | 54.8 | 6.9 |
| Fe | 93.2 | 3.9 | 0.4 | 2.6 |
| C  | 0.0 | 3.5 | 4.8 | 91.6 |

COMPARATIVE EXAMPLE 1

| RECOVERY RATIO | COARSE PARTICLE +4.8 mm (%) | INTERMEDIATE PRODUCT -4.8 +0.3 mm MAG (%) | INTERMEDIATE PRODUCT -4.8 +0.3 mm non-MAG (%) | FINE PARTICLE -0.3 mm (%) |
|---|---|---|---|---|
| Ni | 1.8 | 90.4 | 1.1 | 6.7 |
| Co | 0.1 | 91.8 | 1.1 | 7.0 |
| Cu | 38.0 | 0.2 | 54.8 | 6.9 |
| Fe | 93.2 | 3.9 | 0.4 | 2.6 |
| C  | 0.0 | 3.5 | 4.8 | 91.6 |

COMPARATIVE EXAMPLE 2

| RECOVERY RATIO | COARSE PARTICLE +1.2 mm (%) | INTERMEDIATE PRODUCT -1.2 +0.6 mm MAG (%) | INTERMEDIATE PRODUCT -1.2 +0.6 mm non-MAG (%) | FINE PARTICLE -0.6 mm (%) |
|---|---|---|---|---|
| Ni | 3.5 | 8.7 | 2.8 | 85.0 |
| Co | 0.0 | 9.1 | 0.7 | 90.2 |
| Cu | 65.7 | 0.0 | 30.3 | 4.0 |
| Fe | 95.4 | 0.8 | 0.9 | 2.9 |
| C  | 0.7 | 0.0 | 0.1 | 99.3 |

COMPARATIVE EXAMPLE 3

| RECOVERY RATIO | COARSE PARTICLE +1.2 mm (%) | INTERMEDIATE PRODUCT -1.2 +0.3 mm MAG (%) | INTERMEDIATE PRODUCT -1.2 +0.3 mm non-MAG (%) | FINE PARTICLE -0.3 mm (%) |
|---|---|---|---|---|
| Ni | 3.5 | 89.2 | 0.6 | 6.6 |
| Co | 0.0 | 92.4 | 0.6 | 7.0 |
| Cu | 65.7 | 0.8 | 28.3 | 5.3 |
| Fe | 95.4 | 1.7 | 0.3 | 2.5 |
| C  | 0.7 | 6.7 | 1.5 | 91.1 |

COMPARATIVE EXAMPLE 4

| RECOVERY RATIO | COARSE PARTICLE +1.2 mm (%) | INTERMEDIATE PRODUCT -1.2 mm MAG (%) | INTERMEDIATE PRODUCT -1.2 mm non-MAG (%) |
|---|---|---|---|
| Ni | 3.5 | 93.6 | 2.9 |
| Co | 0.0 | 96.8 | 3.2 |
| Cu | 65.7 | 0.4 | 34.0 |
| Fe | 95.4 | 2.4 | 2.2 |
| C  | 0.7 | 8.5 | 90.9 |

What is claimed is:

1. A method for recovering a valuable material from a lithium ion secondary battery, the method comprising:
    performing heat treatment on a lithium ion secondary battery;
    crushing a heat-treated object obtained through the heat treatment;
    classifying in a first stage of classification a crushed object obtained through the crushing based on a classification point of 1.2 mm or more and 2.4 mm or less, and classifying in a second stage of classification an intermediate product and a fine particle product obtained on a fine side in the first stage of classification based on a classification point of 0.3 mm or less; and
    repeating one time or more of performing dry magnetic separation on the intermediate product obtained on a coarse side in the second stage of classification and performing dry magnetic separation again on an obtained magnetically attracted matter, wherein
    the heat treatment on the lithium ion secondary battery is performed at 670° C. or more and 1100° C. or less, and
    aluminum to be recovered is melted and separated in a molten state in the heat treatment,
    wherein the repeating one time or more of performing dry magnetic separation on the intermediate product obtained on the coarse side in the second stage of classification and performing dry magnetic separation again on the obtained magnetically attracted matter, is to separate a negative electrode active material and a negative electrode current collector material from a positive electrode active material.

2. The method for recovering a valuable material from a lithium ion secondary battery according to claim 1, wherein in the magnetically attracted matter obtained through performing the dry magnetic separation, a content of a material derived from a negative electrode active material is less than 5%.

3. The method for recovering a valuable material from a lithium ion secondary battery according to claim 2, wherein the material derived from the negative electrode active material is carbon.

4. The method for recovering a valuable material from a lithium ion secondary battery according to claim 1, wherein in the magnetically attracted matter obtained through performing the dry magnetic separation, a content of a metal derived from a negative electrode current collector is less than 0.2%.

5. The method for recovering a valuable material from a lithium ion secondary battery according to claim 4, wherein the metal derived from the negative electrode current collector is copper.

6. The method for recovering a valuable material from a lithium ion secondary battery according to claim 1, wherein the heat treatment is performed under a low oxygen atmosphere having an oxygen concentration of 10.5 mass % or less.

7. The method for recovering a valuable material from a lithium ion secondary battery according to claim 1, further comprising
    performing dry magnetic separation on a coarse particle product obtained on a coarse side in the first stage of classification.

8. The method for recovering a valuable material from a lithium ion secondary battery according to claim 1, wherein cobalt and/or nickel are separated to be recovered as the intermediate product, and
    carbon is separated to be recovered as the fine particle product.

* * * * *